US012762455B2

(12) United States Patent
Paetznick et al.

(10) Patent No.: US 12,762,455 B2
(45) Date of Patent: Oct. 13, 2026

(54) TOPOLOGICAL OUTCOME CODES FOR CLIFFORD CIRCUITS

(71) Applicant: Microsoft Technology Licensing, LLC, Redmond, WA (US)

(72) Inventors: Adam Edward Paetznick, Bellevue, WA (US); Nicolas Guillaume Delfosse, Seattle, WA (US); Jeongwan Haah, Bellevue, WA (US); Michael Edward Beverland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 644 days.

(21) Appl. No.: 18/449,176

(22) Filed: Aug. 14, 2023

(65) Prior Publication Data

US 2025/0061369 A1 Feb. 20, 2025

(51) Int. Cl.
*G06N 10/70* (2022.01)

(52) U.S. Cl.
CPC .................................... *G06N 10/70* (2022.01)

(58) Field of Classification Search
CPC ...................................................... G06N 10/70
See application file for complete search history.

(56) References Cited

U.S. PATENT DOCUMENTS

| | | | | |
|---|---|---|---|---|
| 9,748,976 | B2 * | 8/2017 | Naaman | H03M 13/157 |
| 11,444,636 | B2 * | 9/2022 | Lucarelli | H03M 13/616 |
| 11,900,221 | B1 * | 2/2024 | Chamberland | G06N 10/60 |
| 11,966,817 | B1 * | 4/2024 | Shutty | G06N 10/00 |
| 12,007,835 | B1 * | 6/2024 | Chamberland | G06F 11/08 |
| 12,057,859 | B1 * | 8/2024 | Chamberland | G06F 11/10 |
| 12,112,240 | B2 * | 10/2024 | Delfosse | G06N 20/00 |
| 12,147,874 | B2 * | 11/2024 | Barber | G06N 10/70 |
| 12,165,013 | B1 * | 12/2024 | Chamberland | G06F 11/08 |
| 2019/0044543 | A1 * | 2/2019 | Chamberland | H03M 13/13 |
| 2021/0019223 | A1 * | 1/2021 | Chamberland | G06N 10/70 |
| 2022/0198311 | A1 * | 6/2022 | Delfosse | G06N 10/70 |
| 2023/0027698 | A1 * | 1/2023 | Hastings | H03M 13/1102 |
| 2024/0063821 | A1 * | 2/2024 | Zhang | G06N 10/70 |
| 2024/0168731 | A1 * | 5/2024 | Litinski | G06F 8/41 |

(Continued)

OTHER PUBLICATIONS

KR20260052025 A, filed Jul. 25, 2024, published Apr. 17, 2026, Phase Result Code for the Clifford Circuit (Year: 2024).*

(Continued)

*Primary Examiner* — Barbara M Level
(74) *Attorney, Agent, or Firm* — Alleman Hall LLP

(57) ABSTRACT

A method to correct a fault in the application of a Clifford circuit to a qubit register of a quantum computer comprises: (a) receiving circuit data defining the Clifford circuit; (b) receiving additional data identifying one or more measurements belonging to each of a plurality of faces of a lattice; (c) emitting an outcome code based on the circuit data, the outcome code including a series of outcome checks each corresponding to an anticipated error syndrome for the application of the Clifford circuit to the qubit register; and (d) emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

20 Claims, 7 Drawing Sheets

(56) References Cited

U.S. PATENT DOCUMENTS

| | | | | |
|---|---|---|---|---|
| 2024/0403688 A1* | 12/2024 | van den Berg | ........ | G06N 10/20 |
| 2025/0005421 A1* | 1/2025 | Zhu | ........................ | G06N 10/70 |
| 2026/0119957 A1* | 4/2026 | Choukroun | ............ | G06N 10/70 |

OTHER PUBLICATIONS

Bacon, et al., "Sparse Quantum Codes from Quantum Circuits", STOC '15: Proceedings of the forty-seventh annual ACM symposium on Theory of Computing, vol. No. 63, Issue No. 4, Jun. 14, 2015, pp. 327-334.
International Search Report and Written Opinion received for PCT Application No. PCT/US2024/039453, Nov. 11, 2024, 12 pages.
Berlekamp, et al.,"On the inherent intractability of certain coding problems," IEEE Transactions on Information theory, 1978, pp. 384-386.
Delfosse, et al., "Splitting decoders for correcting hypergraph faults", arXiv:2309.15354v1, Sep. 27, 2023, 12 pages.
Delfosse, et al.,"Almost-linear time decoding algorithm for topological codes," Quantum, Nov. 24, 2021, 12 Pages.
Delfosse, et al.,"Spacetime codes of clifford circuits," arXiv preprint, May 26, 2023, 33 Pages.
Dennis, et al.,"Topological quantum memory," Journal of Mathematical Physics, 2002, pp. 4452-4505.
Haah, et al.,"Boundaries for the Honeycomb Code," Quantum, Apr. 18, 2022, 12 Pages.
Hastings, et al.,"Dynamically generated logical qubits," Quantum, Oct. 12, 2021, 19 Pages.
Paetznick, et al.,"Topological outcome codes," May 25, 2023, 3 Pages.

* cited by examiner

Algorithm 1 (`topological outcome code`).

Input:

- A length-$k$ sequence $C$ of Clifford operations,
- a set of faces $\mathcal{F}$ each consisting of a set of indexes in $[k]$.

Output: A set of checks of $C$, suitable for topological decoders.

---

1: Find the outcome code $R$ of $C$ (Algorithm 1 of [Ref. 1])
2: Construct a binary matrix $O$ with columns indexed by measurements of $C$ and rows corresponding to indicator vectors for checks of $R$.
3: Permute the columns of $O$ so that they are in chronological order.
4: Initialize $T$ as the empty set.
5: for each face $F \in \mathcal{F}$ do
6: Find the shortened code $O_F$ of $O$ supported on $F$
7: Compute $O'_F$, the succinct row-echelon form of $O_F$ (Procedure 2)
8: Set $T \leftarrow T \cup O'_F$.
9: Output $T$

*FIG. 5*

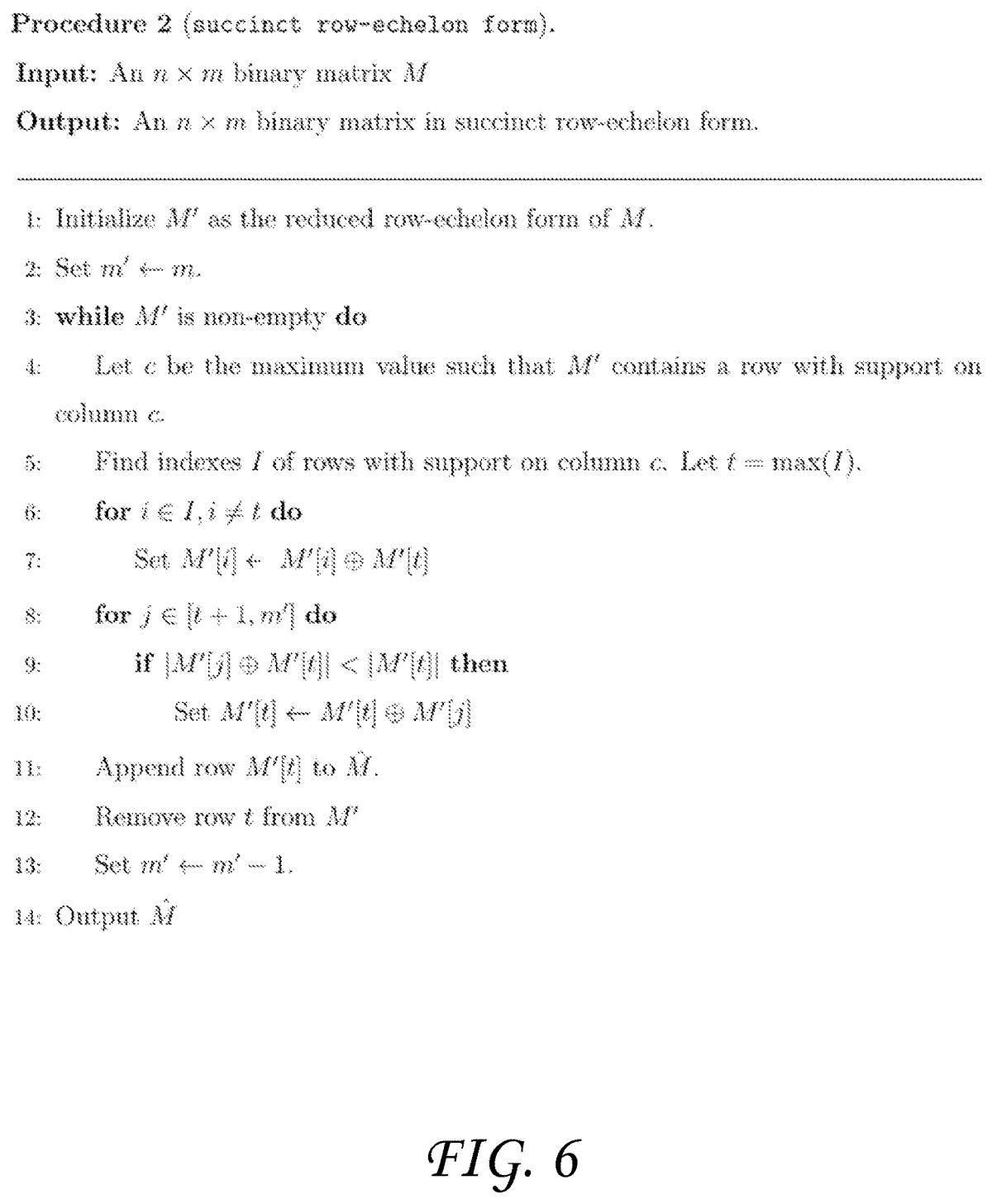

Procedure 2 (`succinct row-echelon form`).

Input: An $n \times m$ binary matrix $M$

Output: An $n \times m$ binary matrix in succinct row-echelon form.

---

Initialize $M'$ as the reduced row-echelon form of $M$.
Set $m' \leftarrow m$.
while $M'$ is non-empty do
    Let $c$ be the maximum value such that $M'$ contains a row with support on column $c$.
    Find indexes $I$ of rows with support on column $c$. Let $t = \max(I)$.
    for $i \in I, i \neq t$ do
        Set $M'[i] \leftarrow M'[i] \oplus M'[t]$
    for $j \in [t+1, m']$ do
        if $|M'[j] \oplus M'[t]| < |M'[t]|$ then
            Set $M'[t] \leftarrow M'[t] \oplus M'[j]$
    Append row $M'[t]$ to $\hat{M}$.
    Remove row $t$ from $M'$
    Set $m' \leftarrow m' - 1$.
Output $\hat{M}$

*FIG. 6*

TOPOLOGICAL OUTCOME CODES FOR CLIFFORD CIRCUITS

BACKGROUND

A quantum computer is a physical machine configured to execute logical operations based on quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning.

SUMMARY

One aspect of this disclosure relates to a method to correct a fault in the application of a Clifford circuit to a qubit register of a quantum computer. The method comprises (a) receiving circuit data defining the Clifford circuit; (b) receiving additional data identifying one or more measurements belonging to each of a plurality of faces of a lattice; (c) emitting an outcome code based on the circuit data, the outcome code including a series of outcome checks each corresponding to an anticipated error syndrome for the application of the Clifford circuit to the qubit register; and (d) emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

Another aspect of this disclosure relates to a computer system coupled operatively to a quantum computer. The computer system comprises a processor and, operatively coupled to the processor, computer memory holding instructions that cause the processor to correct a fault in an application of a Clifford circuit to a qubit register of the quantum computer. The instructions comprise (a) instructions for receiving circuit data defining the Clifford circuit, (b) instructions for receiving additional data identifying one or more measurements belonging to each of a plurality of faces of a lattice, (c) instructions for emitting an outcome code based on the circuit data, the outcome code including a series of outcome checks each corresponding to an anticipated error syndrome for the application of the Clifford circuit to the qubit register, and (d) instructions for emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 5 is an illustration of an example algorithm producing code checks that can be used with topological decoders.

FIG. 6 is an illustration of an example procedure to transform the checks of shortened code, in the algorithm of FIG. 5, into a succinct chronological ordering.

DETAILED DESCRIPTION

1. Overview

As described in further detail herein, [Ref. 1]proposed an end-to-end process for detecting and correcting faults in Clifford circuits. A limitation of that process is that it implements either a lookup-table decoder, which may be difficult to construct, or an LDPC decoder, which may incur significant runtime cost. Proposed here is an extension of the process of [Ref. 1] which is compatible with topological decoders, such as minimum-weight perfect matching and union-find, which are efficient to construct and to execute. More particularly, this extension enables automated decoder construction for topological code implementations, including surface codes and Floquet codes.

2. Quantum-Computer Architecture

Figure 1:
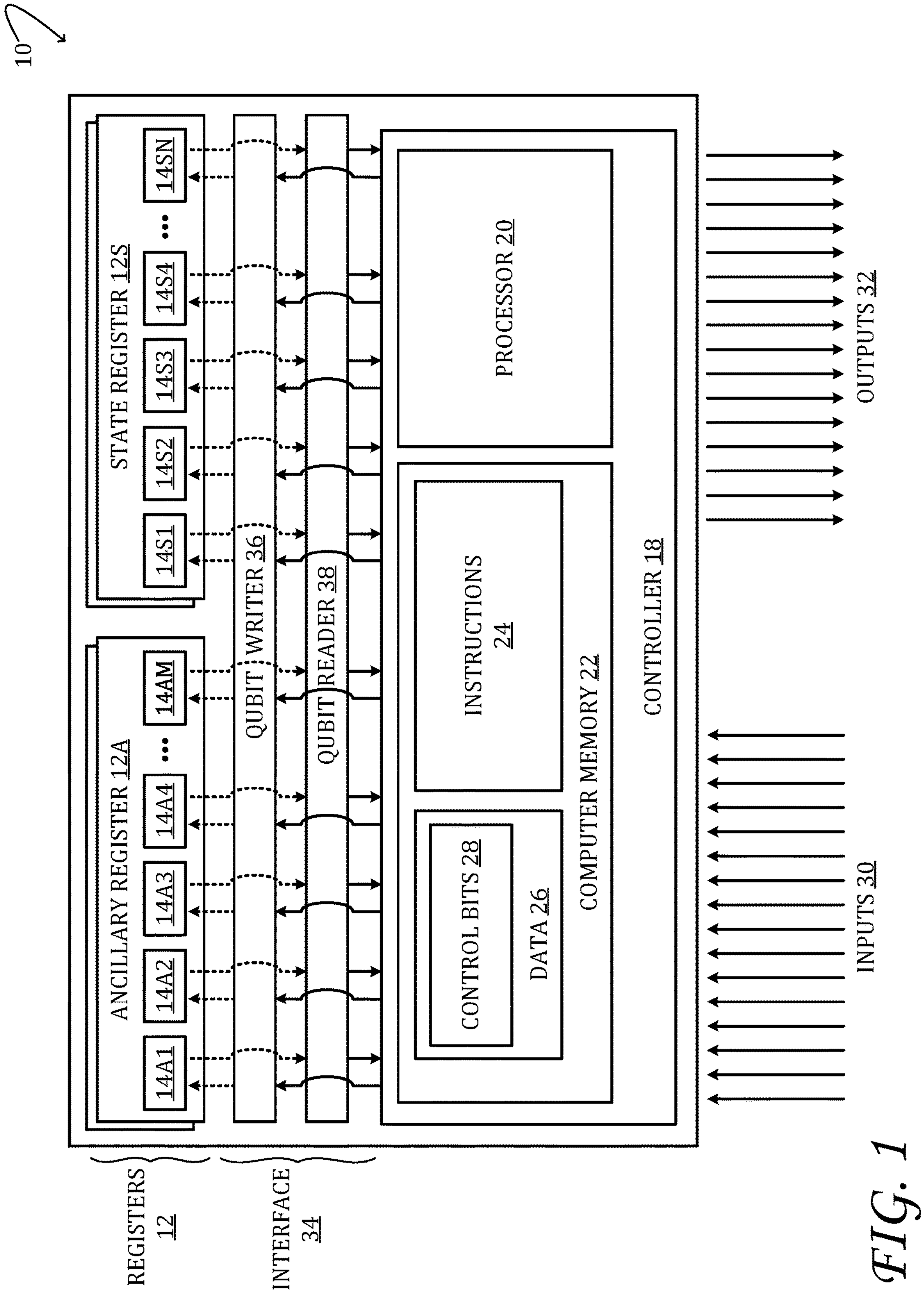
FIG. 1 shows aspects of an example quantum computer.

In order to provide a context for quantum error correction via topological outcome codes, some aspects of an example quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes a set of qubit registers 12—e.g., state register 12S and auxiliary register 12A. Each qubit register includes a series of qubits 14. The number of qubits in a qubit register is not particularly limited but may be determined based on the complexity of the quantum logic to be enacted by the quantum computer.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. A qubit may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

Figure 2:
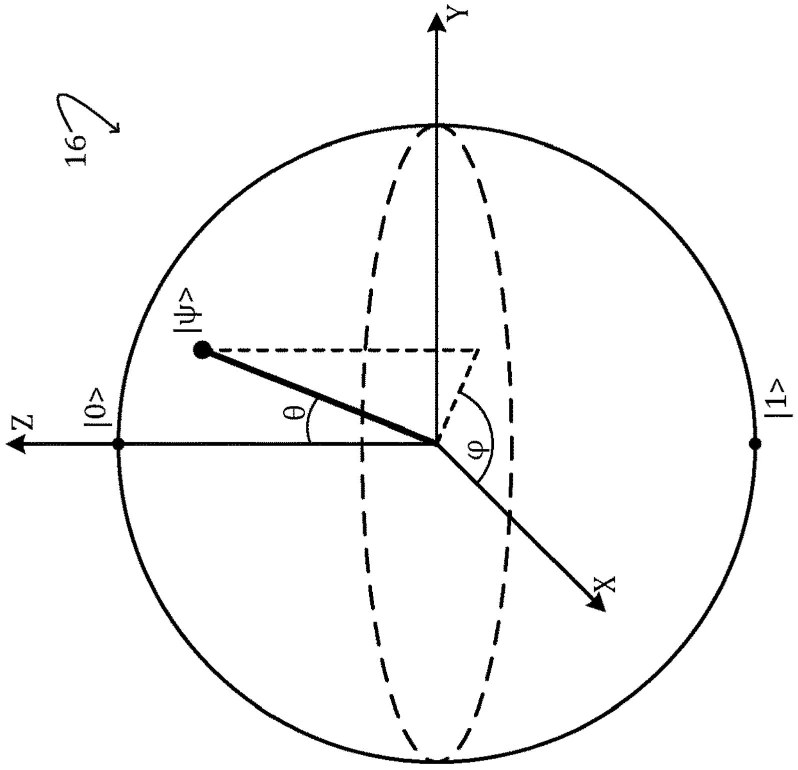
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively-up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. Processor 20 may be coupled operatively to peripheral componentry, such as network componentry, to enable the quantum computer to be operated remotely. Processor 20 may take the form of a central processing unit (CPU), a graphics processing unit (GPU), or the like. As such, controller 18 may comprise classical electronic componentry. The terms 'classical' and 'non-quantum' are applied herein to any component that can be modeled accurately without considering the quantum state of any individual particle therein. Classical electronic components include integrated, microlithographed transistors, resistors, and capacitors, for example. Computer memory 22 may be configured to hold program instructions 24 that cause processor 20 to execute any function or process of controller 18. The computer memory may also be configured to hold additional data 26. In some examples, data 26 may include a register of classical control bits 28 that influence the operation of the quantum computer during run time—e.g., to provide classical control input to one or more quantum-gate operations. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 30 and to provide a plurality of outputs 32. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit registers 12 via quantum interface 34. The quantum interface is configured to exchange data (solid lines) bidirectionally with the controller. The quantum interface is further configured to exchange signal associated with the data (dashed lines) bidirectionally with the qubit registers. Depending on the physical implementation of qubits 14, such signal may include electrical, magnetic, and/or optical signal. Via signal conveyed through the quantum interface, the controller may interrogate and otherwise influence the quantum state held in any, some, or all of the qubit registers, as defined by the collective quantum state of the qubits therein. To that end, the quantum interface includes qubit writer 36 and qubit reader 38. The qubit writer is configured to output a signal to one or more qubits of a qubit register based on write-data received from the controller. The qubit reader is configured to sense a signal from one or more qubits of a qubit register and to output read-data to the controller based on the signal. The read-data received from the qubit reader may, in some examples, be an estimate of an observable to the measurement of the quantum state held in a qubit register. Taken together, controller 18 and interface 34 may be referred to as a 'control system'.

In some examples, suitably configured signal from qubit writer 36 may interact physically with one or more qubits 14 of a qubit register 12, to trigger measurement of the quantum state held in the one or more qubits. Qubit reader 38 may then sense a resulting signal released by the one or more qubits pursuant to the measurement, and may furnish read-data corresponding to the resulting signal to controller 18. Stated another way, the qubit reader may be configured to output, based on the signal received, an estimate of one or more observables reflecting the quantum state of one or more qubits of a qubit register, and to furnish the estimate to controller 18. In one non-limiting example, the qubit writer may provide, based on data from the controller, an appropriate voltage pulse or pulse train to an electrode of one or more qubits, to initiate a measurement. In short order, the qubit reader may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 34 may be configured to implement one or more quantum-logic gates to operate on the quantum state held in a qubit register 12. The term 'state vector' refers herein to the quantum state held in the series of qubits 14S of state register 12S of quantum computer 10. Whereas the function of each type of logic gate of a classical computer system is described according to a corresponding truth table, the function of each type of quantum gate is described by a corresponding operator matrix. The operator matrix operates on (i.e., multiplies) the complex vector representing a qubit register state and effects a specified rotation of that vector in Hilbert space.

For example, the Hadamard gate H is defined by $$H = \frac{1}{\sqrt{2}}\begin{bmatrix} 1 & 1 \\ 1 & -1 \end{bmatrix}. \tag{1}$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$.

The phase gate S is defined by $$S=\begin{bmatrix}1 & 0\\ 0 & e^{i\pi/2}\end{bmatrix}. \quad (2)$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating $|\psi\rangle$ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP=\begin{bmatrix}1 & 0 & 0 & 0\\ 0 & 0 & 1 & 0\\ 0 & 1 & 0 & 0\\ 0 & 0 & 0 & 1\end{bmatrix}. \quad (3)$$

A 'Clifford gate' is a quantum gate that belongs to the Clifford group—viz., a set of quantum gates that effect permutations of the Pauli operators. For the n-qubit case the Pauli operators form a group $$P_n=\left\{e^{\frac{i\theta\pi}{2}}\sigma_{j_1}\otimes\ldots\otimes\sigma_{j_n}\;\middle|\;\theta=0,1,2,3,\ j_k=0,1,2,3\right\}, \quad (4)$$

where $\sigma_0, \ldots \sigma_3$ are the single-qubit Pauli matrices. The Clifford group is then defined as the group of unitaries that normalize the Pauli group, $$C_n=\{V\in U_{2^n}\mid VP_nV^\dagger=P_n\}. \quad (5)$$

The foregoing list of quantum gates and associated operator matrices is non-exhaustive, but is provided for ease of illustration. Other quantum gates include Pauli −X, −Y, and −Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
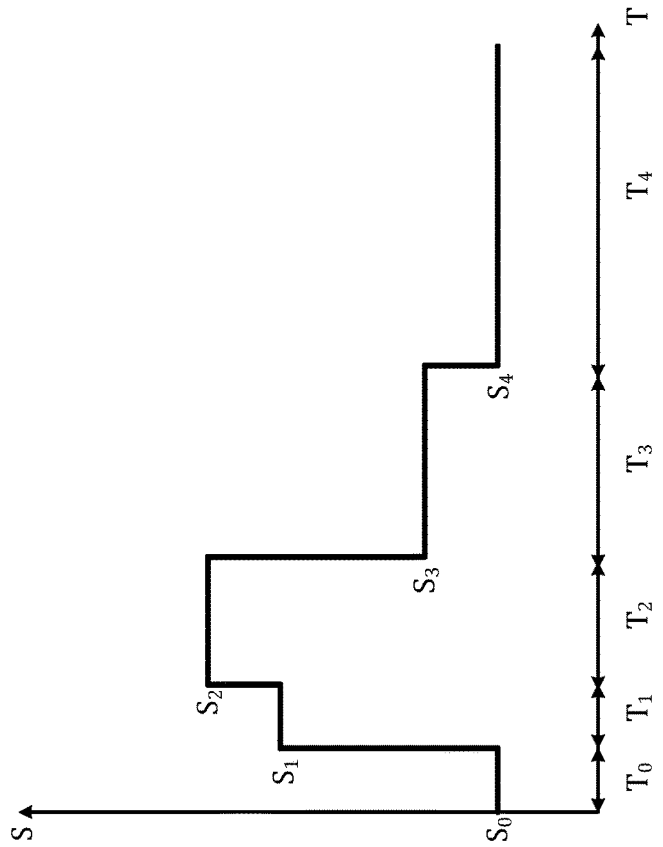
FIG. 3 shows aspects of an example signal waveform for effecting a quantum-gate operation or measurement in a quantum computer.

Continuing in FIG. 1, suitably configured signal from qubit writer 36 of quantum interface 34 may interact physically with one or more qubits 14 of a qubit register 12 so as to assert any desired quantum-gate operation. As noted above, the desired quantum-gate operations include specifically defined rotations of a complex vector representing a qubit register state. In some examples, in order to effect a desired rotation O, the qubit writer may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of a qubit register. In general, each signal level $S_i$ and each duration $T_i$ is a control parameter adjustable by appropriate programming of controller 18.

The terms 'quantum circuit' and 'quantum algorithm' are used herein to describe a predetermined sequence of elementary quantum-gate and/or measurement operations executable by quantum computer 10. A quantum circuit may be used to transform the quantum state of a qubit register 12 to effect a classical or non-elementary quantum-gate operation or to apply a density operator, for example. In some examples, a quantum circuit may be used to enact a predefined operation f(x), which may be incorporated into a complex sequence of operations. To ensure adjoint operation, a quantum circuit mapping n input qubits $|x\rangle$ to m output or auxiliary qubits $|y=f(x)\rangle$ may be defined as a quantum gate $O(|x\rangle\otimes|(y\rangle)$ operating on the (n+m) qubits. In this case, O may be configured to pass the n input qubits unchanged but combine the result of the operation f(x) with the auxiliary qubits via an XOR operation, such that $O(|x\rangle\otimes|y\rangle)=|x\rangle\otimes|y\oplus f(x)\rangle$.

Implicit in the description herein is that each qubit 14 of any qubit register 12 may be interrogated via quantum interface 34 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting quantum algorithm or circuit that reveals the quantum state of the logical qubit with above-threshold confidence.

3. Topological Outcome Codes

Due to the inherent difficulty in isolating qubits from their noisy environment, reliable execution of large-scale quantum algorithms will almost certainly require the use of quantum error correction. A quantum error correction circuit contains sets of measurements for which the parity of outcomes is predetermined in the absence of errors. Accordingly, these sets of measurements correspond to checks of a code that can be used to identify errors and correct them. For a wide class of quantum circuits, the so-called 'outcome code' can be found efficiently [Ref. 1].

A significant challenge, however, is mapping violations of code checks back to the corresponding causal errors—i.e., decoding. The general decoding problem is NP-hard [Ref. 2]. [Ref. 1]proposed a sparsification algorithm to identify low-weight checks of the outcome code that can be used to efficiently construct a so-called LDPC decoder. Unfortunately, the runtime of current LDPC decoders for quantum codes is slow, which makes them difficult or infeasible to use at scale. Furthermore, these decoders do not perform well in general for topological quantum codes.

Decoders based on minimum-weight perfect matching (MWPM) [Ref. 3] and union-find (UF) algorithms [Ref. 4] offer substantially better runtime, and can be used for popular and practical quantum codes including surface codes [Ref. 3] and Floquet codes [Ref. 5][Ref. 6]. However, these topological decoders require the corresponding code checks to satisfy additional constraints, beyond being simply low weight. In particular, the natural structure for topological decoders is one in which each circuit fault violates exactly two code checks. The sparsification algorithm of [Ref. 1] is not guaranteed to respect that structure.

Figure 4:
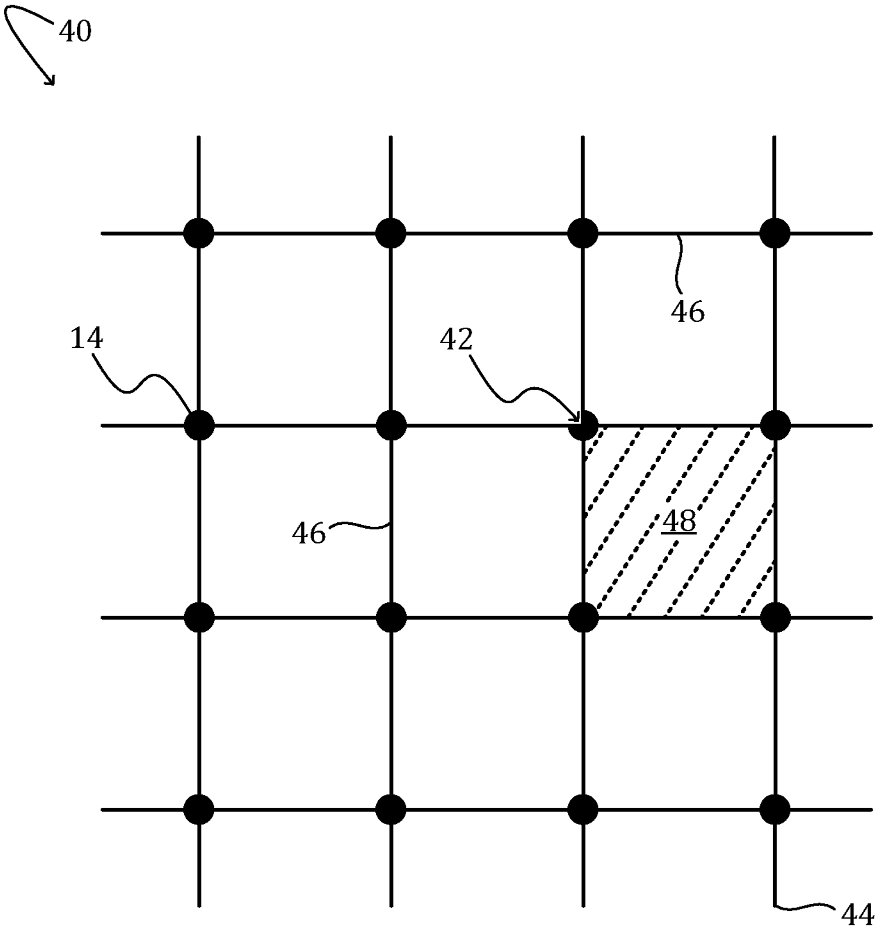
FIG. 4 is a schematic illustration of a lattice of physical qubits in one, non-limiting example.

Some of the terminology used in this disclosure can be visualized with reference to FIG. 4, a schematic illustration of a lattice 40 of physical qubits 14. Consistent with the description in Section 1, each physical qubit contributes one degree of freedom to the overall quantum state held in a quantum computer (e.g., in qubit registers 12 of FIG. 1). In some examples, each degree of freedom is a spin-½ degree of freedom, as represented by the block sphere of FIG. 2. In lattice 40, each physical qubit 14 is mapped to a corresponding vertex 42 of planar graph 44. The structure and properties of the planar graph can be understood in the context of graph theory, which will be familiar to the skilled reader. In the illustrated example, lattice 40 is a square lattice; that feature is not strictly necessary, however, as lattices of non-square geometries are also envisaged. In planar graph 44 edges 46 intersect at the set of vertices 42 and also define a set of faces 48. In a topological error-correcting quantum code, a stabilizer operator $A_i$ operates on the physical qubits that surround each vertex i. In addition, a stabilizer operator B operates on the physical qubits that define each face j. The 'stabilizer space' of the topological error-correcting quantum code is the vector space for which each of the operators A and B reduces to the identity operator. For a toric topological error-correcting quantum code (as one non-limiting example) the stabilizer space is four-dimensional and capable, therefore, of representing two logical qubits of quantum information. Generally speaking, each circuit fault will move the quantum state of lattice 40 out of the stabilizer space, resulting in vertices and faces for which operators A and or B differ from the identity operator. The positions of such anomalous operators on lattice 40 defines the 'syndrome' of the topological error-correcting quantum code, which can be used for error correction. For additional information, the interested reader is referred to the extensive literature on topological error-correcting quantum codes.

FIG. 5 is an illustration of an example Algorithm 1, code which produces checks that can be used with topological decoders. The high-level idea is to exploit the lattice structure by searching for checks of the outcome code along the timelines of the lattice faces. For each face, there is a corresponding shortened outcome code. Checks of the shortened code are transformed into a succinct chronological ordering, defined hereinafter.

For input circuits based on topological codes, such as toric codes, or Floquet codes, the output of Algorithm 1 is a set of checks that can be used to construct a topological decoder. Each check corresponds to a vertex in a graph. Each possible fault in the circuit is detected by some subset of the checks. That subset of checks corresponds to an edge or a hyperedge in the graph. If each fault is detected by two or fewer checks, then the graph is free of hyperedges and can be used directly by a MWPM or UF decoder. Otherwise, hyperedges can be transformed into edges in some other manner—e.g., as described in [Ref. 7].

FIG. 6 is an illustration of an example Procedure 2 to transform the checks of the shortened code into a succinct chronological ordering, which is obtained by a sequence of row operations. First, the matrix of checks is put into reduced row-echelon form. Since Algorithm 1 orders columns chronologically, it establishes a unique starting point for each check. The remaining task, then, is to transform each row so that it has a unique ending point and so that the total duration is minimized. In each iteration, the row with the latest ending point is identified. If there are multiple rows with the same ending point, then the bottom-most such row is selected and used to reduce the ending points of the remaining rows, making them more 'succinct'. Then, the weight of the selected row is reduced, if possible.

In addition to the circuit, Algorithm 1 requires an input that identifies the measurements belonging to each face of a lattice. The choice of lattice depends on the quantum error correcting code from which the circuit is derived. For example, the surface code corresponds to a square lattice and the honeycomb code corresponds to a hexagonal lattice. In some examples this input can be supplied by the user. In other examples, however, the faces can inferred programmatically from the circuit. For some circuits the face inference is straightforward. For example, CNOT-based syndrome extraction circuits for the surface code designate some qubits as data and some qubits as ancillary. The coordinate of each ancillary qubit corresponds to the center of a face. The entire face is then defined by the CNOT gates with support on the center. For circuits composed of one- and two-qubit measurements, such as those used for Floquet codes, a planar embedding can be calculated and used to identify the faces.

Some circuits, even those based on topological codes, may contain checks that are either non-local within a lattice face, or are not confined to a lattice face. This may happen, for example, for circuits that prepare and measure logical operators of the code. Such global checks may interfere with construction and performance of topological decoders.

Certain variants of Algorithm 1 account for this scenario. One option is to keep only those checks with duration below some cutoff value. For typical syndrome extraction circuits in which a constant-depth circuit is applied repeatedly, the cutoff value will be proportional to the depth of the repeated subcircuit. Another option is to modify Line 8, which adds all unique checks found for a given face. In other examples, an appropriate algorithm may add only those checks that are not already in the span of the set T. This is computationally more expensive, but ensures that non-local checks appear at most once in the set of checks.

Figure 7:
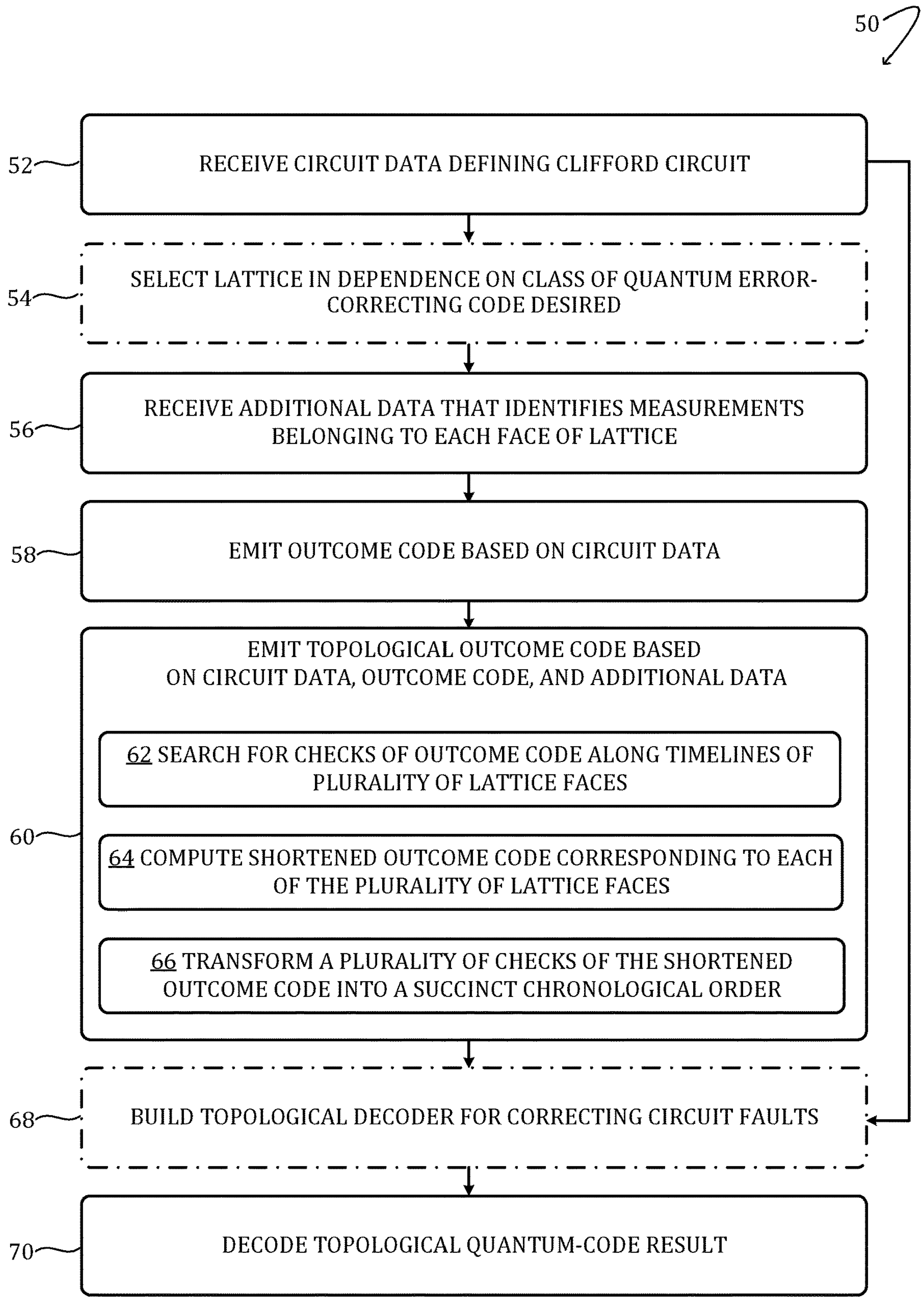
FIG. 7 shows aspects of an example method to correct one or more faults in the application of a Clifford circuit to a qubit register of a quantum computer.

FIG. 7 shows aspects of an example method 50 to correct one or more faults in the application of a Clifford circuit to a qubit register of a quantum computer. Generally speaking, each Clifford circuit applicable to this method comprises one or more Clifford gates and may also comprise one or more Pauli measurements.

At 52 of method 50 the classical computer receives circuit data defining the Clifford circuit. At 54 the classical computer selects a lattice in dependence on the Clifford circuit and on the class of quantum error correcting code desired. For example, a square lattice may be selected when surface code is desired, or a hexagonal lattice when honeycomb code is desired. Operationally, the classical computer may reach a decision regarding the lattice based on the circuit data received at 52.

At 56 the classical computer receives additional data identifying one or more measurements belonging to each of a plurality of faces of the lattice. At 58 the classical computer emits an outcome code based on the circuit data. The outcome code includes a series of outcome checks, each corresponding to an anticipated error syndrome for the application of the Clifford circuit to the qubit register. Typically the outcome code emitted at 58 is an arbitrary-basis outcome code; it is not necessarily a topological outcome code at this stage of the process and may not be suitable for downstream topological decoding.

At 60 the classical computer emits a topological outcome code based on the circuit data, the additional data, and the outcome code. The topological outcome code includes a series of check operators that support quantum-error correction via a topological decoder. In this way method 50 enables fault correction in the application of the Clifford circuit to the qubit register. In some examples the topological outcome code may comprise a surface code; in some examples the topological outcome code may comprise a Floquet code. Other types of topological outcome code are also envisaged. Generally speaking, each fault exposed and corrected in method 50 violates exactly two outcome checks of the topological outcome code, in accordance with topological decoding.

More specifically, in emitting the topological outcome code, the classical computer accumulates, at 62, outcome checks along a plurality of timelines of the plurality of faces of the lattice. For each of the plurality of faces of the lattice, the classical computer computes, at 64, a shortened outcome code corresponding that face. At 66 the classical computer transforms (e.g., reorders) a plurality of outcome checks of the shortened outcome code into a succinct chronological order. In some examples the succinct chronological order is an order that reduces overlap among the outcome checks. In some examples the succinct chronological order is an order that reduces the duration of one or more of the outcome checks.

Method 50 admits of numerous variants and extensions. For instance, the outcome code corresponding to the circuit may include at least one outcome check which is non-local within a face of the lattice or not confined to any face of the lattice. In some examples the method may address this condition by keeping such outcome checks only when the duration of the outcome check is below a predetermined threshold. In more particular variants of this approach, the Clifford circuit may be a syndrome-extraction circuit in which a subcircuit of constant depth is applied repeatedly. Here the threshold can be proportional to the constant depth. In other examples where the outcome code includes an outcome check which is non-local within a face of the lattice or not confined to any face of the lattice, only those outcome checks that are not within an existing span of an accumulation set are accumulated—e.g., at line 8 of Algorithm 1.

Continuing in method 50, at 68 a classical computer builds a topological decoder for the topological outcome code. Generally speaking, the topological decoder may be built in dependence on the circuit data received at 62. In some examples the topological decoder is built further in dependence on the additional data received at 64. At 70 the topological decoder decodes the execution result of the topological outcome code in order to correct the one or more faults in the application of the Clifford circuit to the qubit register. In some examples the topological decoder is a minimum-weight perfect-matching or union-find decoder.

4. References, Classical-Computer Description, and Conclusion

The interested reader is referred to the following references, hereby incorporated herein by reference for all purposes:

[Ref. 1] Nicolas Delfosse and Adam Paetznick, "Spacetime codes of Clifford circuits" (2023).
[Ref. 2] Elwyn Berlekamp, Robert McEliece, and Henk Van Tilborg, "On the inherent intractability of certain coding problems (corresp.)" IEEE *Transactions on Information Theory* 24:3, 384-386 (1978).
[Ref. 3] Eric Dennis, *Alexei* Kitaev, Andrew Landahl, and John Preskill, "Topological quantum memory" *Journal of Mathematical Physics* 43:9, 4452-4505 (2002).
[Ref. 4] Nicolas Delfosse and Naomi H. Nickerson, "Almost-linear time decoding algorithm for topological codes" *Quantum* 5, 595 (2021).
[Ref. 5] Matthew B. Hastings and Jeongwan Haah, "Dynamically generated logical qubits" *Quantum* 5, 564 (2021).
[Ref. 6] Jeongwan Haah and Matthew B. Hastings, "Boundaries for the Honeycomb Code" *Quantum* 6, 693 (April 2022).
[Ref. 7] Nicolas Delfosse, Adam Paetznick, Jeongwan Haah, Matthew Hastings, and Marcus Silva, "Splitting decoder for quantum codes".

The methods herein may be tied to a computer system of one or more computing devices. Such methods and processes may be implemented as an application program or service, an application programming interface (API), a library, and/or other computer-program product.

Figure 8:
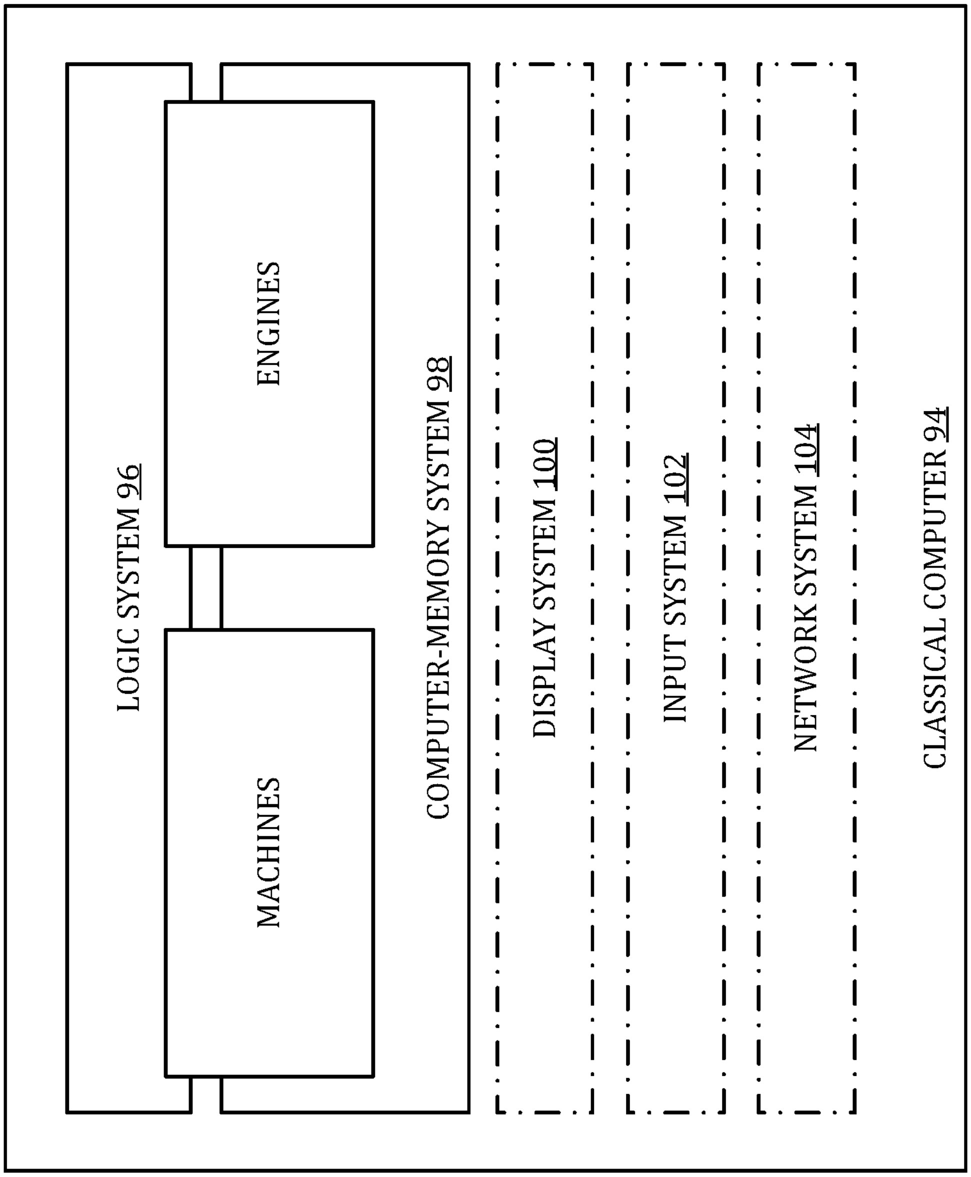
FIG. 8 shows aspects of an example classical computer system applicable to the algorithm of FIG. 5, the procedure of FIG. 6, and the method of FIG. 7.

FIG. 8 provides a schematic representation of a classical computer 94 configured to provide some or all of the classical computer system functionality disclosed herein. Classical computer 94 may take the form of a personal computer, application-server computer, or any other computing device.

Classical computer 94 includes a logic system 96 and a computer-memory system 98. Classical computer 94 may optionally include a display system 100, an input system 102, a network system 104, and/or other systems not shown in the drawings.

Logic system 96 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 98 includes at least one physical device configured to temporarily and/or permanently hold computer system information, such as data and instructions executable by logic system 96. When the computer-memory system includes two or more devices, the devices may be collocated or remotely located. Computer-memory system 98 may include at least one volatile, nonvolatile, dynamic, static, read/write, read-only, random-access, sequential-access, location-addressable, file-addressable, and/or content-addressable computer-memory device. Computer-memory system 98 may include at least one removable and/or built-in computer-memory device. When the logic system executes instructions, the state of computer-memory system 98 may be transformed—e.g., to hold different data.

Aspects of logic system 96 and computer-memory system 98 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 96 and computer-memory system 98 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 100 may be used to present a visual representation of data held by computer-memory system 98. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 102 may comprise or interface with one or more input devices. An input device may include a sensor device or a user input device. Examples of user input devices include a keyboard, mouse, or touch screen.

When included, network system 104 may be configured to communicatively couple classical computer 94 with one or more other computer systems. The network system may include wired and/or wireless communication devices compatible with one or more different communication protocols. The network system may be configured for communication via personal-, local- and/or wide-area networks.

In conclusion, one aspect of this disclosure is directed to a method to correct a fault in an application of a Clifford circuit to a qubit register of a quantum computer, the method comprising: (a) receiving circuit data defining the Clifford circuit; (b) receiving additional data identifying one or more measurements belonging to each of a plurality of faces of a lattice; (c) emitting an outcome code based on the circuit data, the outcome code including a series of outcome checks each corresponding to an anticipated error syndrome for the application of the Clifford circuit to the qubit register; and (d) emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

In some implementations the topological outcome code comprises a surface code or a Floquet code. In some implementations the fault is one of a plurality of faults, and each fault violates exactly two outcome checks. In some implementations the method further comprises selecting the lattice in dependence on the Clifford circuit and class of quantum error-correcting code. In some implementations the outcome code includes an outcome check which is non-local within a face of the lattice or not confined to any face of the lattice, and the method further comprises keeping that outcome check only if a duration of the outcome check is below a predetermined threshold. In some implementations the Clifford circuit is a syndrome-extraction circuit in which a subcircuit of constant depth is applied repeatedly, and the threshold is proportional to the constant depth. In some implementations emitting the topological outcome code includes accumulating outcome checks along a plurality of timelines of the plurality of faces of the lattice, and, for each of the plurality of faces of the lattice: computing a shortened outcome code corresponding that face; and transforming a plurality of outcome checks of the shortened outcome code into a chronological order that reduces overlap among the outcome checks and/or duration of one or more of the outcome checks. In some implementations the outcome code includes an outcome check which is non-local within a face of the lattice or not confined to any face of the lattice, and only those outcome checks that are not within an existing span of an accumulation set are accumulated. In some implementations the Clifford circuit includes one or more Clifford gates. In some implementations the Clifford circuit includes one or more Pauli measurements. In some implementations the method further comprises: building a topological decoder for the topological outcome code; and decoding an execution result of the topological outcome code via the topological decoder to correct the fault in the application of the Clifford circuit to the qubit register. In some implementations the topological decoder is a minimum-weight perfect-matching or union-find decoder. In some implementations the topological decoder is built in dependence on the circuit data.

Another aspect of this disclosure is directed to a computer system coupled operatively to a quantum computer, the computer system comprising a processor; and operatively coupled to the processor, computer memory holding instructions that cause the processor to correct a fault in an application of a Clifford circuit to a qubit register of the quantum computer. The instructions comprise: (a) instructions for receiving circuit data defining the Clifford circuit, (b) instructions for receiving additional data identifying one or more measurements belonging to each of a plurality of faces of a lattice, (c) instructions for emitting an outcome code based on the circuit data, the outcome code including a series of outcome checks each corresponding to an anticipated error syndrome for the application of the Clifford circuit to the qubit register, and (d) instructions for emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

In some implementations the instructions further comprise instructions for selecting the lattice in dependence on the Clifford circuit and class of quantum error-correcting code. In some implementations emitting the topological outcome code includes accumulating outcome checks along a plurality of timelines of the plurality of faces of the lattice, and, for each of the plurality of faces of the lattice: computing a shortened outcome code corresponding that face; and transforming a plurality of outcome checks of the shortened outcome code into a chronological order that reduces overlap among the outcome checks and/or duration of one or more of the outcome checks. In some implementations the instructions further comprise instructions for: building a topological decoder for the topological outcome code; and decoding an execution result of the topological outcome code via the topological decoder to correct the fault in the application of the Clifford circuit to the qubit register. In some implementations the topological decoder is a minimum-weight perfect-matching or union-find decoder. In some implementations the topological decoder is built in dependence on the circuit data.

Another aspect of this disclosure is directed to a method to correct a fault in an application of a Clifford circuit to a qubit register of a quantum computer. The method comprises: (a) receiving circuit data defining the Clifford circuit; (b) receiving additional data identifying one or more measurements belonging to each of a plurality of faces of a lattice; (c) emitting an outcome code based on the circuit data, the outcome code including a series of outcome checks each corresponding to an anticipated error syndrome for the application of the Clifford circuit to the qubit register; and (d) emitting a topological outcome code based on the circuit data, the additional data, and the outcome code, the topological outcome code including a series of check operators that support quantum-error correction via a topological decoder, thereby enabling fault correction in the application of the Clifford circuit to the qubit register, and emitting the topological outcome code includes accumulating outcome checks along a plurality of timelines of the plurality of faces of the lattice, and, for each of the plurality of faces of the lattice, computing a shortened outcome code corresponding that face, and transforming a plurality of outcome checks of the shortened outcome code into a chronological order that reduces overlap among the outcome checks and/or duration of one or more of the outcome checks.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see. The plots shown in the drawings are theoretical unless otherwise noted.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to correct a fault in an application of a Clifford circuit to a qubit register of a quantum computer, the method comprising:

receiving circuit data defining the Clifford circuit;

receiving additional data identifying one or more measurements belonging to each of a plurality of faces of a lattice;

emitting an outcome code based on the circuit data, the outcome code including a series of outcome checks each corresponding to an anticipated error syndrome for the application of the Clifford circuit to the qubit register; and emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

2. The method of claim 1 wherein the topological outcome code comprises a surface code or a Floquet code.

3. The method of claim 1 wherein the fault is one of a plurality of faults, and wherein each fault violates exactly two outcome checks.

4. The method of claim 1 further comprising selecting the lattice in dependence on the Clifford circuit and class of quantum error-correcting code.

5. The method of claim 1 wherein the outcome code includes an outcome check which is non-local within a face of the lattice or not confined to any face of the lattice, the method further comprising keeping that outcome check only if a duration of the outcome check is below a predetermined threshold.

6. The method of claim 5 wherein the Clifford circuit is a syndrome-extraction circuit in which a subcircuit of constant depth is applied repeatedly, and wherein the threshold is proportional to the constant depth.

7. The method of claim 1 wherein emitting the topological outcome code includes accumulating outcome checks along a plurality of timelines of the plurality of faces of the lattice, and, for each of the plurality of faces of the lattice:

computing a shortened outcome code corresponding that face; and transforming a plurality of outcome checks of the shortened outcome code into a chronological order that reduces overlap among the outcome checks and/or duration of one or more of the outcome checks.

8. The method of claim 1 wherein the outcome code includes an outcome check which is non-local within a face of the lattice or not confined to any face of the lattice, and wherein only those outcome checks that are not within an existing span of an accumulation set are accumulated.

9. The method of claim 1 wherein the Clifford circuit includes one or more Clifford gates.

10. The method of claim 1 wherein the Clifford circuit includes one or more Pauli measurements.

11. The method of claim 1 further comprising:

building a topological decoder for the topological outcome code; and decoding an execution result of the topological outcome code via the topological decoder to correct the fault in the application of the Clifford circuit to the qubit register.

12. The method of claim 11 wherein the topological decoder is a minimum-weight perfect-matching or union-find decoder.

13. The method of claim 11 wherein the topological decoder is built in dependence on the circuit data.

14. A computer system coupled operatively to a quantum computer, the computer system comprising:

a processor; and operatively coupled to the processor, computer memory holding instructions that cause the processor to correct a fault in an application of a Clifford circuit to a qubit register of the quantum computer, the instructions comprising:

instructions for receiving circuit data defining the Clifford circuit, instructions for receiving additional data identifying one or more measurements belonging to each of a plurality of faces of a lattice, instructions for emitting an outcome code based on the circuit data, the outcome code including a series of outcome checks each corresponding to an anticipated error syndrome for the application of the Clifford circuit to the qubit register, and instructions for emitting a topological outcome code based on the circuit data, the additional data, and the outcome code, the topological outcome code including a series of check operators that support quantum-error correction via a topological decoder, thereby enabling fault correction in the application of the Clifford circuit to the qubit register.

15. The computer system of claim 14 wherein the instructions further comprise instructions for selecting the lattice in dependence on the Clifford circuit and class of quantum error-correcting code.

16. The computer system of claim 14 wherein emitting the topological outcome code includes accumulating outcome checks along a plurality of timelines of the plurality of faces of the lattice, and, for each of the plurality of faces of the lattice:

computing a shortened outcome code corresponding that face; and transforming a plurality of outcome checks of the shortened outcome code into a chronological order that reduces overlap among the outcome checks and/or duration of one or more of the outcome checks.

17. The computer system of claim 14 wherein the instructions further comprise instructions for:

building a topological decoder for the topological outcome code; and decoding an execution result of the topological outcome code via the topological decoder to correct the fault in the application of the Clifford circuit to the qubit register.

18. The computer system of claim 17 wherein the topological decoder is a minimum-weight perfect-matching or union-find decoder.

19. The computer system of claim 17 wherein the topological decoder is built in dependence on the circuit data.

20. A method to correct a fault in an application of a Clifford circuit to a qubit register of a quantum computer, the method comprising:

receiving circuit data defining the Clifford circuit;

receiving additional data identifying one or more measurements belonging to each of a plurality of faces of a lattice;

emitting an outcome code based on the circuit data, the outcome code including a series of outcome checks each corresponding to an anticipated error syndrome for the application of the Clifford circuit to the qubit register; and emitting a topological outcome code based on the circuit data, the additional data, and the outcome code, the topological outcome code including a series of check operators that support quantum-error correction via a topological decoder, thereby enabling fault correction in the application of the Clifford circuit to the qubit register, wherein emitting the topological outcome code includes accumulating outcome checks along a plurality of timelines of the plurality of faces of the lattice, and, for each of the plurality of faces of the lattice, computing a shortened outcome code corresponding that face, and transforming a plurality of outcome checks of the shortened outcome code into a chronological order that reduces overlap among the outcome checks and/or duration of one or more of the outcome checks.

* * * * *